(12) United States Patent
Xu

(10) Patent No.: US 10,747,827 B2
(45) Date of Patent: Aug. 18, 2020

(54) METHOD AND APPARATUS FOR PUSHING INFORMATION

(71) Applicant: Baidu Online Network Technology (Beijing) Co., Ltd., Beijing (CN)

(72) Inventor: Dong Xu, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 183 days.

(21) Appl. No.: 15/748,708

(22) PCT Filed: Jun. 28, 2016

(86) PCT No.: PCT/CN2016/087437
§ 371 (c)(1),
(2) Date: Jan. 30, 2018

(87) PCT Pub. No.: WO2017/133171
PCT Pub. Date: Aug. 10, 2017

(65) Prior Publication Data
US 2019/0012384 A1    Jan. 10, 2019

(30) Foreign Application Priority Data
Feb. 3, 2016 (CN) .......................... 2016 1 0077527

(51) Int. Cl.
*G06F 17/00* (2019.01)
*G06F 16/951* (2019.01)
(Continued)

(52) U.S. Cl.
CPC ............ *G06F 16/951* (2019.01); *G06F 16/00* (2019.01); *G06F 16/907* (2019.01);
(Continued)

(58) Field of Classification Search
CPC .. G06F 16/9038; G06F 16/907; G06F 16/951; G06F 16/955; G06F 16/9577
See application file for complete search history.

(56) References Cited

U.S. PATENT DOCUMENTS

| | | | |
|---|---|---|---|
| 2012/0276996 | A1 | 11/2012 | Tran et al. |
| 2012/0303442 | A1 | 11/2012 | Patwa et al. |

(Continued)

FOREIGN PATENT DOCUMENTS

| | | |
|---|---|---|
| CN | 102298590 A | 12/2011 |
| CN | 102542001 A | 4/2012 |

(Continued)

OTHER PUBLICATIONS

Search Report for related International Application No. PCT/CN2016/087437; reported on Oct. 26, 2016.

*Primary Examiner* — Truong V Vo
(74) *Attorney, Agent, or Firm* — Miller, Matthias & Hull LLP

(57) ABSTRACT

The present disclosure discloses a method and apparatus for pushing information. A specific embodiment of the method comprises: receiving input information of a user from an information input terminal; performing a search operation based on the input information to obtain search result information; determining an information output terminal based on one or more of: indication information for the information output terminal extracted from the input information, historical indication information for the information output terminal of the user, and use scenario information of the user; and pushing the search result information to the determined information output terminal. In this embodiment, a plurality of terminals are effectively used, and thus, the searching and the pushing for information based on the plurality of terminals are implemented.

11 Claims, 6 Drawing Sheets

(51) Int. Cl.
  *G06F 16/957*    (2019.01)
  *G06F 16/00*     (2019.01)
  *G06F 16/907*    (2019.01)
  *G06F 16/955*    (2019.01)
  *G06F 16/9038*   (2019.01)

(52) U.S. Cl.
  CPC ........ *G06F 16/9038* (2019.01); *G06F 16/955* (2019.01); *G06F 16/9577* (2019.01)

(56) References Cited

U.S. PATENT DOCUMENTS

2016/0128121 A1    5/2016  Koriyama
2017/0329856 A1*  11/2017  Jiang ...................... H04L 67/26

FOREIGN PATENT DOCUMENTS

| | | |
|---|---|---|
| CN | 103246708 A | 8/2013 |
| CN | 103365872 A | 10/2013 |
| CN | 103379125 A | 10/2013 |
| CN | 104239440 A | 12/2014 |
| CN | 105094535 A | 11/2015 |
| EP | 2838062 A1 | 2/2015 |
| JP | 2012234543 A | 11/2012 |
| JP | 2013174979 A | 9/2013 |
| JP | 2013210876 A | 10/2013 |
| JP | 2015153351 A | 8/2015 |

* cited by examiner

METHOD AND APPARATUS FOR PUSHING INFORMATION

CROSS-REFERENCE TO RELATED APPLICATION

This application is a 35 USC § 371 US National Stage filing of International Application No. PCT/CN2016/087437 filed on Jun. 28, 2016, and claims the priority of Chinese Patent Application No. 201610077527.3 filed on Feb. 3, 2016, the content of which is incorporated herein by reference in its entirely.

TECHNICAL FIELD

The present disclosure relates to the field of computer technology, specifically to the field of Internet technology, and more specifically to a method and apparatus for pushing information.

BACKGROUND

Currently, one approach to acquire information required by a user is to perform a search operation in order to acquire search result information. The search is mainly performed through a search portal on a computer webpage or a search interface of an application on a mobile device. When the search is performed by using the webpage on the computer, all interactions including inputting and outputting are performed on a webpage of a computer browser. When the search is performed by using the application on the mobile device, all interactions are performed on the mobile device.

However, with the development of the Internet of Everything, the user expects that a search interaction is not only limited to a single computer or mobile device, but multiple devices capable of interconnecting, interworking and combining with each other. For instance, the user may wish to input a search condition through an application on a cell phone by voice, and show the search result through a large screen on the computer.

SUMMARY

The present disclosure provides an improved method and apparatus for pushing information to solve the technical problems mentioned in the foregoing Background section.

In a first aspect, the present disclosure provides a method for pushing information, comprising: receiving input information of a user from an information input terminal; performing a search operation based on the input information to obtain search result information; determining an information output terminal based on one or more of: indication information for the information output terminal extracted from the input information, historical indication information for the information output terminal of the user, and use scenario information of the user; and pushing the search result information to the determined information output terminal.

In some embodiments, when the number of the information output terminals is one, the information output terminal is different from the information input terminal.

In some embodiments, the use scenario information comprises at least one of: a device type of the information input terminal, a device type of a terminal having a user account logged in same as a user account logged into the information input terminal, and position information of the terminal having the same user account logged in.

In some embodiments, the input information further comprises a search time parameter, for indicating time for the search operation by using the search information.

In some embodiments, the performing a search operation based on the input information to obtain search result information comprises: analyzing the input information to extract the search information; performing the search operation based on the search information to obtain result information; and serving the result information as the search result information, if a list of website information of preset vertical websites does not include website information of a website originating the result information, wherein the website information comprises at least one of a name of the website, a domain name of the website and an IP address of the website.

In some embodiments, the performing a search operation based on the input information to obtain search result information comprises: analyzing the input information to extract the search information; performing the search operation based on the search information to obtain first result information; and sending the search information to a server of a website originating the first result information, to acquire a search result returned by the server as second result information, and serving the second result information, or the second result information and the first result information as the search result information, if a list of website information of preset vertical websites includes website information of a website originating the first result information, wherein the website information comprises at least one of a name of the website, a domain name of the website and an IP address of the website.

In a second aspect, the present disclosure provides an apparatus for pushing information, comprising: a receiving unit, configured to receive input information of a user from an information input terminal; a searching unit, configured to perform a search operation based on the input information to obtain search result information; a determining unit, configured to determine an information output terminal based on one or more of: indication information for the information output terminal extracted from the input information, historical indication information for the information output terminal of the user, and use scenario information of the user; and a pushing unit, configured to push the search result information to the determined information output terminal.

In some embodiments, when a number of the information output terminals is one, the information output terminal is different from the information input terminal.

In some embodiments, the use scenario information comprises at least one of: a device type of the information input terminal, a device type of a terminal having a user account logged in same as a user account logged into the information input terminal, and position information of the terminal having the same user account logged in.

In some embodiments, the input information further comprises a search time parameter, for indicating time for the search operation by using the search information.

In some embodiments, the searching unit is further configured to analyze the input information to extract the search information; perform the search operation based on the search information to obtain result information; and serve the result information as the search result information, if a list of website information of preset vertical websites does not include website information of a website originating the result information, wherein the website information comprises at least one of a name of the website, a domain name of the website and an IP address of the website.

In some embodiments, the searching unit is further configured to analyze the input information to extract the search information; perform the search operation based on the search information to obtain first result information; and send the search information to a server of a website originating the first result information, to acquire a search result returned by the server as second result information, and serve the second result information, or the second result information and the first result information as the search result information, if a list of website information of preset vertical websites includes website information of a website originating the first result information, wherein the website information comprises at least one of a name of the website, a domain name of the website and an IP address of the website.

The method and apparatus for pushing information provided by the present disclosure, receive input information of a user from an information input terminal, perform a search operation based on the input information to obtain search result information; then determine an information output terminal based on one or more of: indication information for the information output terminal extracted from the input information, historical indication information for the information output terminal of the user, and use scenario information of the user; and finally push the search result information to the determined information output terminal. Accordingly, a plurality of terminals are effectively used, and thus, the searching and the pushing for information based on the plurality of terminals are implemented.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
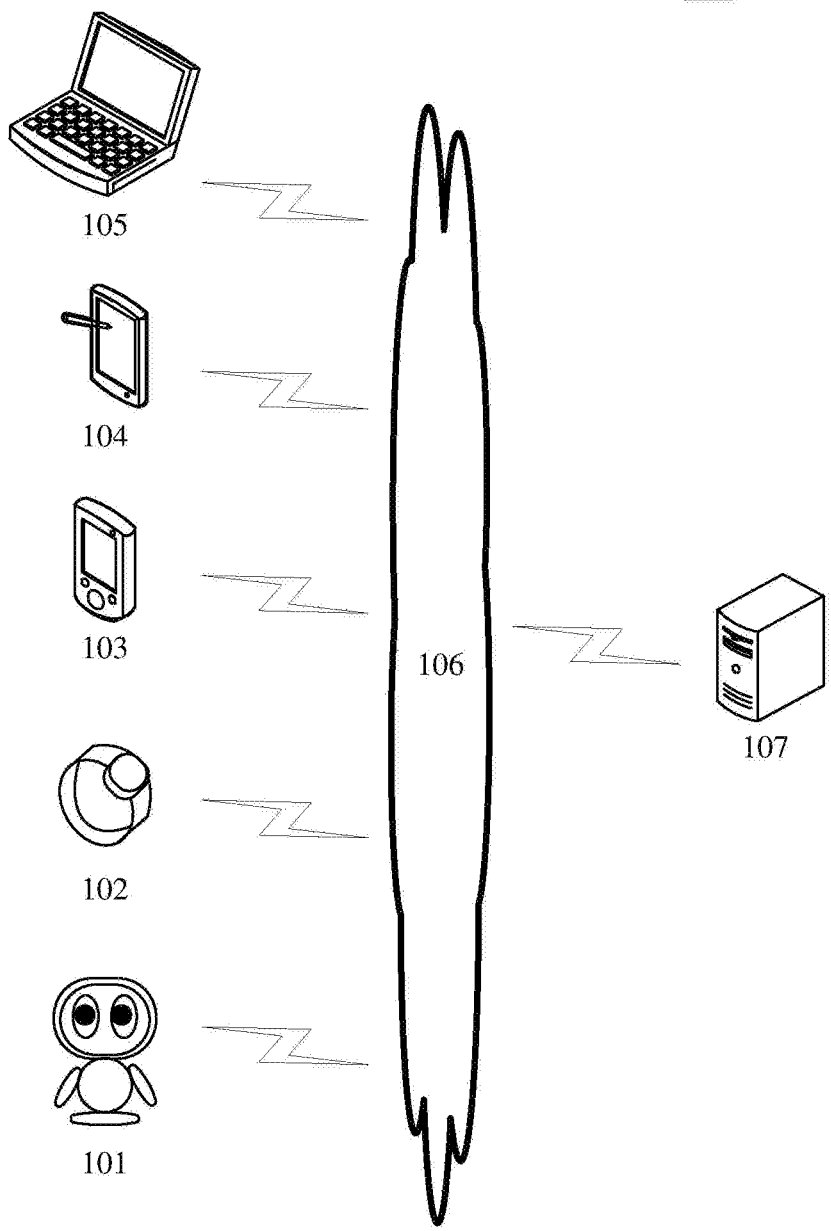
FIG. 1 is an exemplary system architecture diagram in which the present disclosure may be applied.

FIG. 1 shows an exemplary architecture of a system 100 which may be used by a method for pushing information or an apparatus for pushing information according to the embodiments of the present disclosure.

As shown in FIG. 1, the system architecture 100 may include terminal devices 101, 102, 103, 104 and 105, a network 106 and a server 107. the network 106 serves as a medium providing a communication link between the terminal devices 101, 102, 103, 104 and 105 and the server 107. the network 106 may include various types of connections, such as wired or wireless transmission links, or optical fibers.

The user 110 may use the terminal devices 101, 102, 103, 104 and 105 to interact with the server 107 through the network 106, in order to transmit or receive messages, etc. Various communication client applications, such as cloud storage applications, shopping applications, search applications, instant messaging tools, mailbox clients, and social platform software may be installed on the terminal devices 101, 102, 103, 104 and 105.

The terminal devices 101, 102, 103, 104 and 105 may be various electronic devices having a display screen and supporting information browsing, including but not limited to, smart phones, tablet computers, e-book readers, mp3 (moving picture experts group audio layer iii) players, mp4 (moving picture experts group audio layer iv) players, laptop computers and desktop computers.

The server 107 may be a server providing various services, for example, a search server providing support to search operations performed by the terminal devices 101, 102, 103, 104 and 105. The search server may perform a search operation based on received user input information to obtain search result information, and finally push the search result information to the terminal.

It should be noted that a method for pushing information provided in embodiments of the present disclosure is generally performed by the server 107, and accordingly, an apparatus for pushing information is generally provided in the server 107.

It should be understood that the numbers of the terminal devices, the networks and the servers in FIG. 1 are merely illustrative. Any number of terminal devices, networks and servers may be provided based on the actual requirements.

Figure 2:
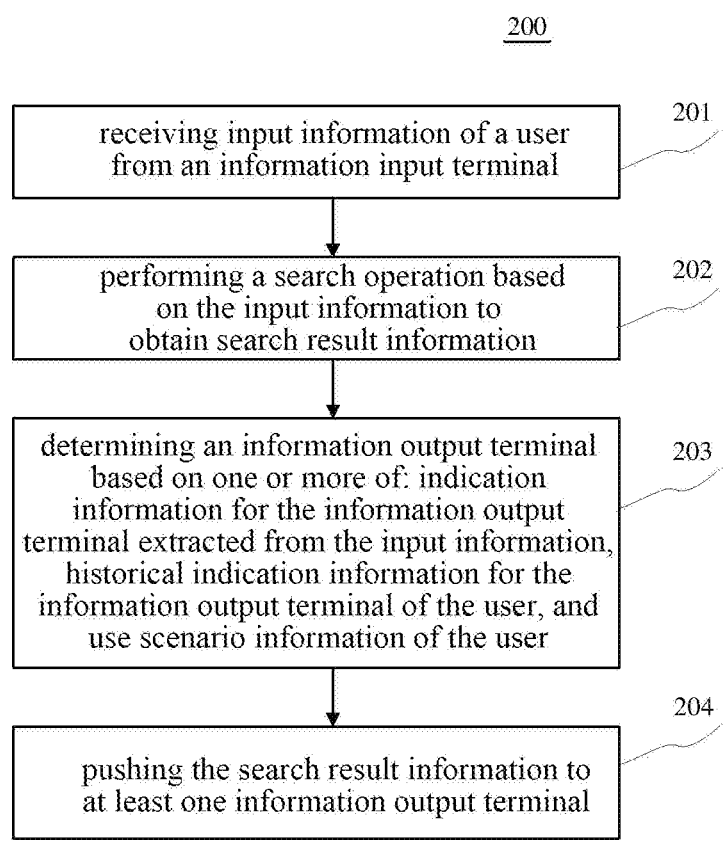
FIG. 2 is a flowchart of an embodiment according to a method for pushing information of the present disclosure.

Further referring to FIG. 2, which illustrates a process 200 of an embodiment according to a method for pushing information of the present disclosure. The method for pushing information includes the following steps.

In step 201, input information of a user is received from an information input terminal.

In this embodiment, an electronic device (for example, the server as illustrated in FIG. 1) on which the method for pushing information operates may receive user input information from a terminal by means of wired connection or wireless connection. Generally, the user input information includes at least one of text information, picture information and voice information.

In this embodiment, the determination for the information input terminal includes the following approaches. First, a terminal which receives the user input information is defaulted to the information input terminal. Second, if there is another terminal which receives information inputted by the user indicating the information input terminal, the information input terminal will be determined according to this information. For instance, the user may indicate a cell phone to be the information input terminal in advance on a computer. Third, the information input terminal is determined based on historical indication information and/or use scenario information. For instance, as the user serves the cell phone as the information input terminal during the last search operation, the cell phone is defaulted to the information input terminal in this search operation.

In this embodiment, the user input information includes search information of the search operation that the user wants to perform, and may also include indication information indicating an information output terminal. For instance, the information inputted by the user may be "search for today's weather, and send it to terminal B".

In this embodiment, the user input information may further include a search time parameter. The search time parameter indicates time for the search operation performed by using the search information.

In step 202, a search operation is performed based on the input information to obtain search result information.

In this embodiment, based on the input information obtained in step 201, the electronic device (for example, the server as illustrated in FIG. 1) may first determine whether the input information includes picture information or voice information based on content of the input information.

If the input information includes the picture information, text in a picture may be first recognized by OCR (Optical Character Recognition) and other technologies, and then a further processing is performed based on the recognized text information. If the input information includes the voice information, the voice information may be first translated into text information by voice recognition technology, and then a further processing is performed based on the text information. In addition, the voice information or a part of the voice information, and the picture information or a part of the picture information may also be served as the search information to perform the search operation.

After a text version of the input information is obtained, a semantic analysis may be performed on the text version of the input information to extract the search information. For instance, segmentation and other processes may be performed on the text version of the input information, to segment the text version of input information into words; and then importance calculation is performed on the obtained words, to acquire keywords as the search information based on a result of the importance calculation. Further, the keywords may also be expanded, the expansion may refer to finding synonyms or near synonyms of the keywords, and the synonyms and near synonyms of the keywords are also served as the search information.

In this embodiment, if the input information further includes the search time parameter, the search time parameter is also extracted when the input information is analyzed. For instance, the input information is "search for the weather of the day at eight o'clock every morning", and after analyzing, the server extracts "the weather of the day" as the search information, and "eight o'clock every morning" as the search time parameter. The search time parameter can also be determined according to user input acquired in a popup form, a dialog box form and other forms. If the search time parameter is extracted, the search operation is performed at the time indicated by the search time parameter. For instance, when the input information is "search for the weather of the day at eight o'clock every morning", "eight o'clock every morning" is extracted as the search time parameter, and "the weather of the day" is extracted as the search information, the server regularly searches for "the weather of the day" at eight o'clock every morning. Specifically, it is also impossible that the terminal regularly initiates a search request regarding "the weather of the day" to the server at eight o'clock every morning.

In this embodiment, in order to acquire better search result information, the following alternative solution can be used.

First, the search operation may be performed based on the above search information, and first result information obtained may be directly served as the search result information. This search may be performed through a meta-search engine. Some basic information of the user (e.g., geographical position information of the user) may be acquired before the search. The basic information of the user may also be served as the search information.

Second, it can be further determined that whether a list of website information of preset vertical websites includes website information of a website originating the first result information. The vertical website refers to a website concentrating on some specific fields or some specific requirement and providing all of depth information and related services associated with the fields or the requirement. The website information includes at least one of a name of the website, a domain name of the website, and an IP address of the website. If the website information of the website originating the first result information is not included in the list, the first result information is served as the search result information. If it is included in the list, the search information is sent to a server of the website originating the first result information, to acquire a search result returned by the server of the website originating the above first result information as second result information. The second result information, or the second result information and the first result information are served as the search result information.

For instance, the input information of the user is "license plate number restrictions", meanwhile, the server determines that a current time period is morning, and acquires that a current geographical position of the user is Beijing city, and thus, it is determined that the requirement of the user may be to learn about traffic restrictions to Beijing motor vehicles before leaving home. The first result information obtained in a first search operation may include a variety of information related to the "license plate number restrictions", for example, "regulations of license plate end-number restrictions for Beijing motor vehicles", "Transport Minister: there are impacts of license plate number restrictions on lives, families did not win a license plate in 3 years" and "license plate number restrictions to vehicles from other cities". As an example, if the list of the website information of the preset vertical websites includes website information of the official website of Beijing Traffic Management Bureau which provides the information "regulations of license plate end-number restrictions for Beijing motor vehicles", and the provided information conforms to the requirement of the user, search results regarding "license plate number restrictions" can be directly acquired from the official website of Beijing Traffic Management Bureau and served as the search result information. Similarly, the above solution may also be suitable for vertical websites of other fields, for example, vertical websites of the weather field and the food and beverage field.

In this embodiment, there may also exist a situation where the first result information obtained in the first search operation cannot meet the requirement of the user. At this time, it can be determined that whether the search information or the first result information includes information of a third party account. The third party account is a special account different from an ordinary user account, and the information of the third party account includes a name of the third party account and/or service contents of the third party account. If information of a third party account is not included, the first result information is served as the search result information. If it is included, the search information is sent to a terminal having the third party account logged in, information returned by the terminal having the third party account logged in is received as third result information. The third result information, or the third result information and the first result information are served as the search result information.

For instance, the search information is "whether the National Museum can be visited on New Year's Day", however, it is known through a feedback of the user that the first result information fails to provide an answer to this question. At this moment, the server determines that the search information includes "the National Museum", which is the account name of the National Museum, as the third party account, the server may send the search information "whether the National Museum can be visited on New Year's Day" to a terminal having the National Museum (as the third party account) logged in, receive response information of the terminal having the National Museum (as the third party account) logged in, and serve this response information as the search result information.

In step 203, an information output terminal is determined based on one or more of: indication information for the information output terminal extracted from the input information, historical indication information for the information output terminal of the user, and use scenario information of the user.

In this embodiment, the input information of the user may include the indication information indicating the information output terminal. To determine the indication information, words similar to "send to", "push to" and frequently-used terminal names may be set as sensitive words, if the input information includes such sensitive words, the indication information can be generated by directly extracting sensitive words regarding the information of the terminal. Similarly, the indication information can be generated through an analysis of a part of the speech and a semantic analysis or by training a generation model using the machine learning method.

For instance, the user inputs the text information "search for today's weather, and send it to terminal B", or the above text information is obtained after the conversion of the voice information or the picture information inputted by the user, "today's weather" is extracted as the search information through the segmentation, the analysis of the part of the speech, the semantic analysis and other processes. In addition, it is detected that the input information includes the sensitive words "send to" and "terminal B". Therefore, the finally generated indication information can be "terminal B is the information output terminal". Moreover, the generated indication information can also be outputted in the popup form and other forms, so as to allow the user to further determine whether the generated indication information is correct.

If information regarding the information output terminal in the indication information only includes a terminal type, it can be defaulted that the information output terminal is a terminal having a account logged in same as a user account logged into the information input terminal, or a terminal positioned near the information input terminal. For instance, the user inputs the information "search for today's weather, and send it to the computer" through a mobile device, it can be defaulted that "the computer" in the input information is a computer having a account logged in same as a user account logged into the mobile device, or a computer included in login device history records of the mobile device having the account currently logged in, or a computer positioned near the mobile device.

The information regarding the information output terminal in the indication information may also include account information of the user. For instance, the indication information may be "the information output terminal is a computer having account A logged in", and account A may be an account currently logged into the information input terminal, or an associated account of the account currently logged into the information input terminal, and the associated account may be an account having friend relationship with the account currently logged into the information input terminal.

In this embodiment, the information output terminal of this time can also be determined based on the historical indication information for the information output terminal of the user. The historical indication information may be information indicating the information output terminal in history records of the user account logged into the information input terminal.

In this embodiment, the information output terminal can also be determined based on the use scenario information. The use scenario information includes at least one of: a device type of the information input terminal, a device type of a terminal having a user account logged in same as a user account logged into the information input terminal, and position information of the terminal having the same user account logged in. For instance, the user inputs the voice information through a smart phone to search, the device type of the information input terminal is the smart phone, terminals having the same user account logged in include a computer, and positions of the computer and the smart phone are close to each other, and thus, the server can determine that the computer, at this time, is the information output terminal, or inquire the user whether the computer should be set to the information output terminal.

An approach of determining the information output terminal may also be a combination of the above determining approaches. For instance, the user inputs the voice information through the cell phone to search, the device type of the information input terminal is the cell phone, terminals having the same user account logged in include two computers, the positions of the two computers are both close to the position of the smart phone. At this time, the server can acquire the historical indication information for the information output terminal of the user, query whether the historical indication information includes information regarding the two computers, and further determine which computer is the information output terminal according to the queried information.

In step 204, the search result information is pushed to at least one information output terminal.

In this embodiment, when the number of the information output terminals is one, the information output terminal is different from the information input terminal. When the number of the information output terminals is two or more, the information output terminal may include the information input terminal.

Figure 3:
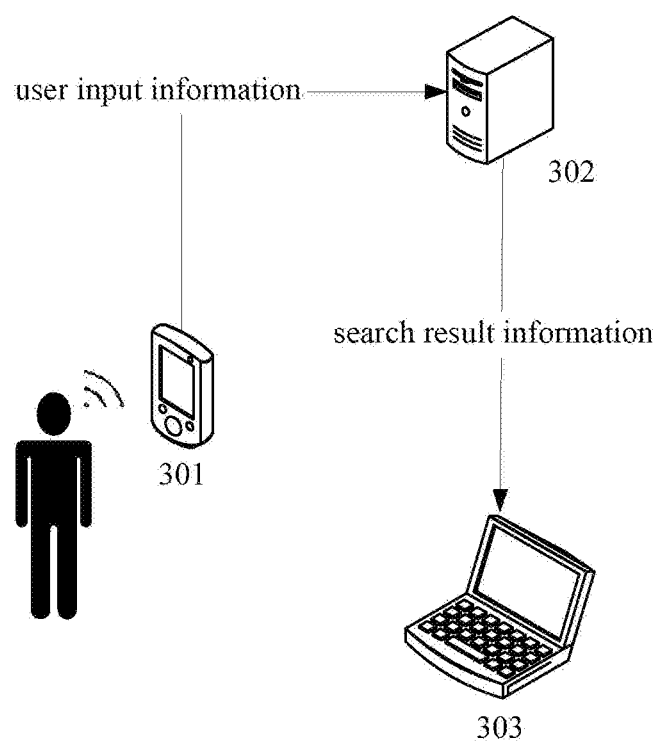
FIG. 3 is a schematic diagram of an application scenario according to the method for pushing information of the present disclosure.

Further referring to FIG. 3, FIG. 3 is a schematic diagram of an application scenario according to the method for pushing information of the present embodiment. In the application scenario of FIG. 3, the user first inputs voice information "search for the full text of the Patent Law, and send it to the compute" through an application installed on terminal 301. After receiving the voice information, terminal 301 serves this voice information as the user input information to send it to server 302. After analyzing and searching, server 302 pushes search result information regarding "the full text of the Patent Law" to terminal 303. At last, terminal 303 shows the received search result information to the user through a browser or other computer programs. Terminal 301 may be a smart phone convenient for inputting voice, or may be a wearable device, etc. Terminal 303 is a device having a large screen and convenient for displaying. Terminal 303 may be a computer having a user account logged in same as or associated with a user account logged into terminal 301, or may be a computer positioned near terminal 301. Therefore, the user can acquire required information more quickly and conveniently by making use of advantages of various terminals.

In the method provided by the embodiment of the present disclosure, a plurality of terminals are effectively utilized, and thus, the searching and the pushing for information based on the plurality of terminals are implemented, through the distinction between the information input terminal and the information output terminal.

Figure 4:
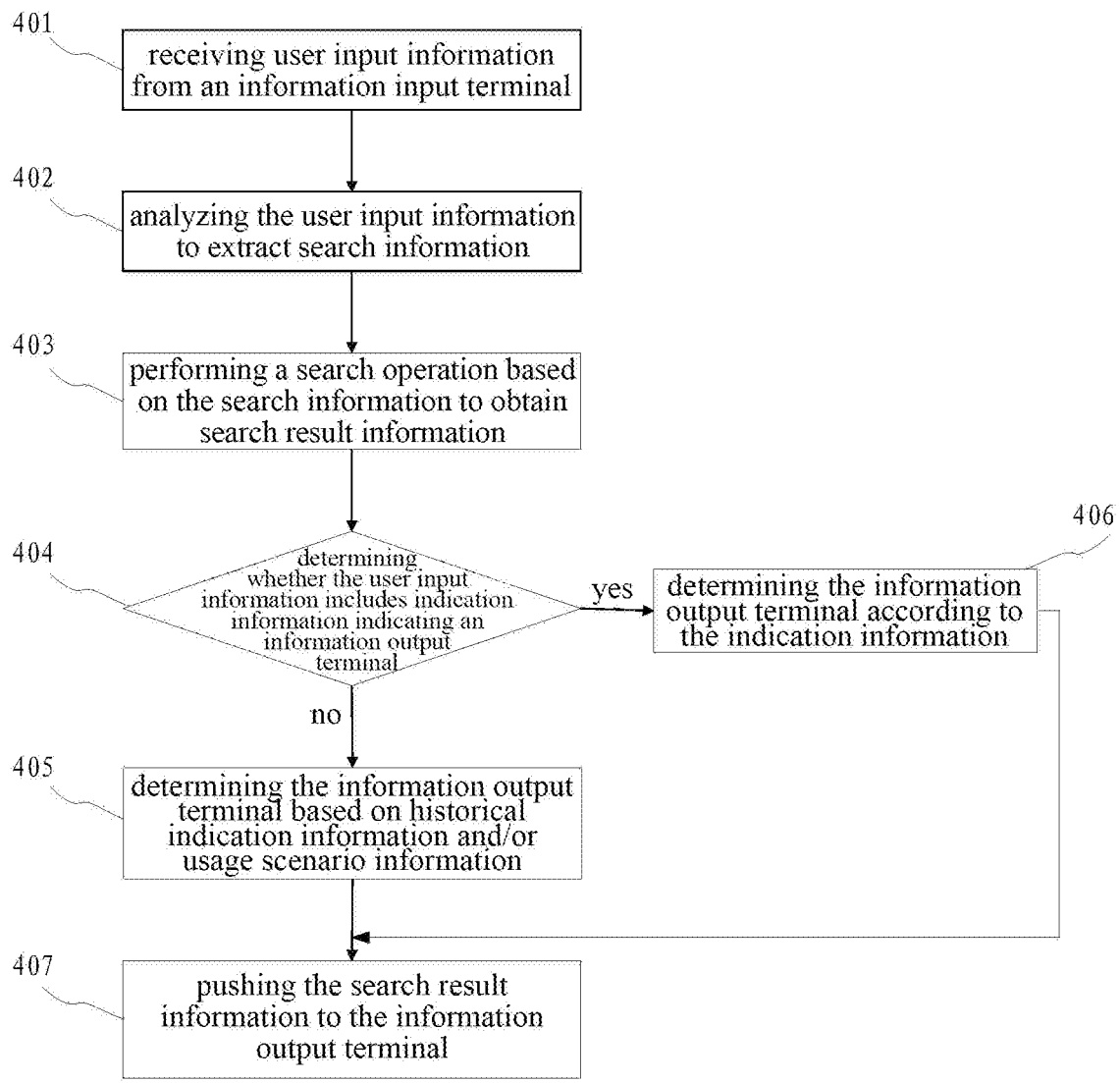
FIG. 4 is a flowchart of another embodiment according to the method for pushing information of the present disclosure.

Further referring to FIG. 4, which illustrates a process 400 of another embodiment according to the method for pushing information of the present disclosure. The process 400 of the method for pushing information includes the following steps.

In step 401, user input information is received from an information input terminal.

In this embodiment, after any terminal enters into a search mode and acquires the user input information, the terminal can be determined as the information input terminal. If the user first sets on terminal B that terminal A is the information input terminal corresponding to terminal B, and terminal B receives a search result corresponding to the user input information of terminal A, step 402, step 403 and step 407 can be directly performed to complete the process of pushing information.

In step 402, the user input information is analyzed to extract search information.

In this embodiment, while the user input information is analyzed to extract the search information, search parameter information and indication information indicating an information output terminal can also be analyzed and extracted together. The search parameter information includes search time parameter, search position parameter and so on. The search position parameter may indicate that a terminal performs a search operation when being in what position.

In step 403, a search operation is performed based on the search information to obtain search result information.

In this embodiment, the search operation may be performed based on a meta-search engine, or may be performed based on a vertical search engine. Preferably, after a first search operation based on the meta search engine is completed, an user intention can be further analyzed to determine the vertical search engine corresponding to information as required by the user, and a second search operation is performed based on the vertical search engine to acquire a better search result. Specifically, the analyzing of user intention may be performed by determining whether the user input information includes some preset keywords, or by establishing a model through the machine learning method.

In step 404, it is determined that whether the user input information includes indication information indicating an information output terminal.

It is determined that whether the user input information includes the indication information indicating the information output terminal, according to the result extracted through analyzing in step 402. If the indication information is included, step 405 is performed. If it is not included, step 406 is performed.

In step 405, the information output terminal is determined according to the indication information.

The information output terminal is determined according to the indication information extracted through analyzing in step 402. For instance, if the user input information is "search for today's weather, and send it to my cell phone", the indication information acquired therefrom is "my cell phone is the information output terminal". According to the indication information, it is determined that the information output terminal is a cell phone having a user account logged in same as a user account logged into the information input terminal.

In step 406, the information output terminal is determined based on historical indication information and/or use scenario information.

In this embodiment, the information output terminal can be determined based on the historical indication information. The historical indication information is information indicating the information output terminal in history records of the user account logged into the information input terminal. For instance, according to the history records of the user, if the information output terminal is always a computer when a mobile device is the information input terminal, and at this time, the user enters into a search interface and inputs the information through the mobile device, the information output terminal is defaulted to the computer.

In this embodiment, the information output terminal can also be determined based on the use scenario information. The use scenario information includes at least one of: a device type of the information input terminal, a device type of a terminal having a user account logged in same as a user account logged into the information input terminal, and position information of the terminal having the same user account logged in. For instance, the information input terminal is a smart watch in wearable devices, terminals having a user account logged in same as a user account logged into the smart watch include a computer and a cell phone, and positions of the cell phone and the smart watch are close to each other. The user inputs voice information "search for how to go somewhere", the scenario of the user may be in a car, and the cell phone fixed at some position is not convenient to operate. Accordingly, if the user inputs by using the smart watch to query a route, the server can determine that the cell phone, at this time, is the information output terminal, based on a model pre-trained by the machine learning method. Samples of the model may come from collected indication information for the information input terminal and the information input terminal of the user in different scenes.

In step 407, the search result information is pushed to the information output terminal.

In this embodiment, when the search result information is pushed to the information output terminal, if the information output terminal is a terminal included in login history of an account currently logged into the information input terminal, or a terminal included in login history of an associated account of the account currently logged into the information input terminal, the pushing can be postponed until the terminal included in the login history is logged into with a corresponding account.

As shown in FIG. 4, different from the embodiment corresponding to FIG. 2, the process 400 of the method for pushing information in this embodiment emphasizes steps of determining the information output terminal. Accordingly, the solution described in this embodiment can determine the information output terminal more flexibly, so that plurality of terminals are used effectively, and thus the searching and the pushing for information based on the plurality of terminals are implemented.

Figure 5:
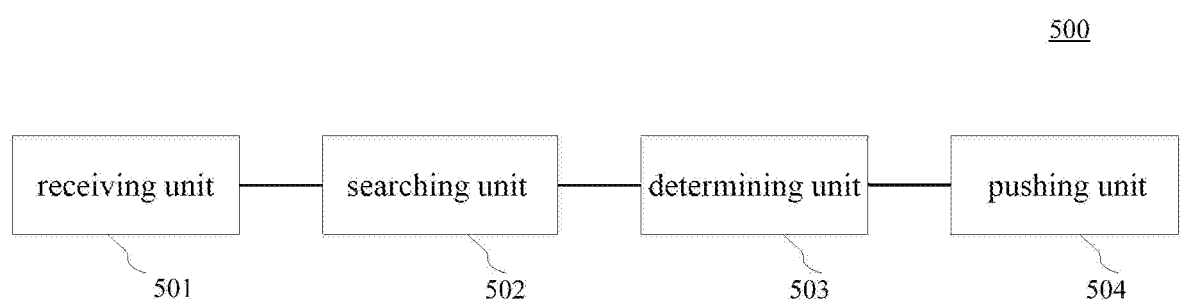
FIG. 5 is a schematic structural diagram of an embodiment according to an apparatus for pushing information of the present disclosure.

Further referring to FIG. 5, as an implementation of the method shown in each of the above-mentioned figures, the present disclosure provides an embodiment of an apparatus for pushing information. The embodiment of this apparatus corresponds to the embodiment of the method as illustrated in FIG. 2, and this apparatus may be applied in various electronic devices.

As shown in FIG. 5, an information pushing apparatus 500 described in this embodiment includes: a receiving unit 501, a searching unit 502, a determining unit 503 and a pushing unit 504. The receiving unit 501 is configured to receive input information of a user from an information input terminal. The searching unit 502 is configured to perform a search operation based on the input information to obtain search result information. The determining unit 503 is configured to determine an information output terminal based on one or more of: indication information for the information output terminal extracted from the input information, historical indication information for the information output terminal of the user, and use scenario information of the user. The pushing unit 504 is configured to push the search result information to the determined information output terminal.

In this embodiment, the receiving unit 501 of the information pushing apparatus 500 may receive the input information from the terminal used by the user, by means of wired connection or wireless connection.

In this embodiment, based on the input information obtained by the receiving unit 501, the searching unit 502 may first acquire the input information, and then perform the search operation based on the input information to obtain the search result information.

In this embodiment, the determining unit 503 of the information pushing apparatus 500 may determine the information output terminal based on one or more of: the indication information for the information output terminal extracted from the input information obtained by the receiving unit 501, the historical indication information for the information output terminal of the user, and the use scenario information of the user.

In this embodiment, the pushing unit 504 may push the search result information to the information output terminal determined by the determining unit 503.

In some alternative implementations of this embodiment, when the number of the information output terminals is one, the information output terminal is different from the information input terminal.

In some alternative implementations of this embodiment, the use scenario information comprises at least one of: a device type of the information input terminal, a device type of a terminal having a user account logged in same as a user account logged into the information input terminal, and position information of the terminal having the same user account logged in.

In some alternative implementations of this embodiment, the input information further comprises a search time parameter, for indicating time for the search operation performed by using the search information.

In some alternative implementations of this embodiment, the searching unit 503 is further configured to: analyze the input information to extract the search information; perform the search operation based on the search information to obtain result information; and serve the result information as the search result information, if a list of website information of preset vertical websites does not include website information of a website originating the result information. The website information comprises at least one of a name of the website, a domain name of the website and an IP address of the website.

In some alternative implementations of this embodiment, the searching unit 503 is further configured to: analyze the input information to extract the search information; perform the search operation based on the search information to obtain first result information; and send the search information to a server of a website originating the first result information, to acquire a search result returned by the server as second result information, and serve the second result information, or the second result information and the first result information as the search result information, if the list of the website information of the preset vertical websites includes website information of the website originating the first result information. The website information comprises at least one of a name of the website, a domain name of the website and an IP address of the website.

Figure 6:
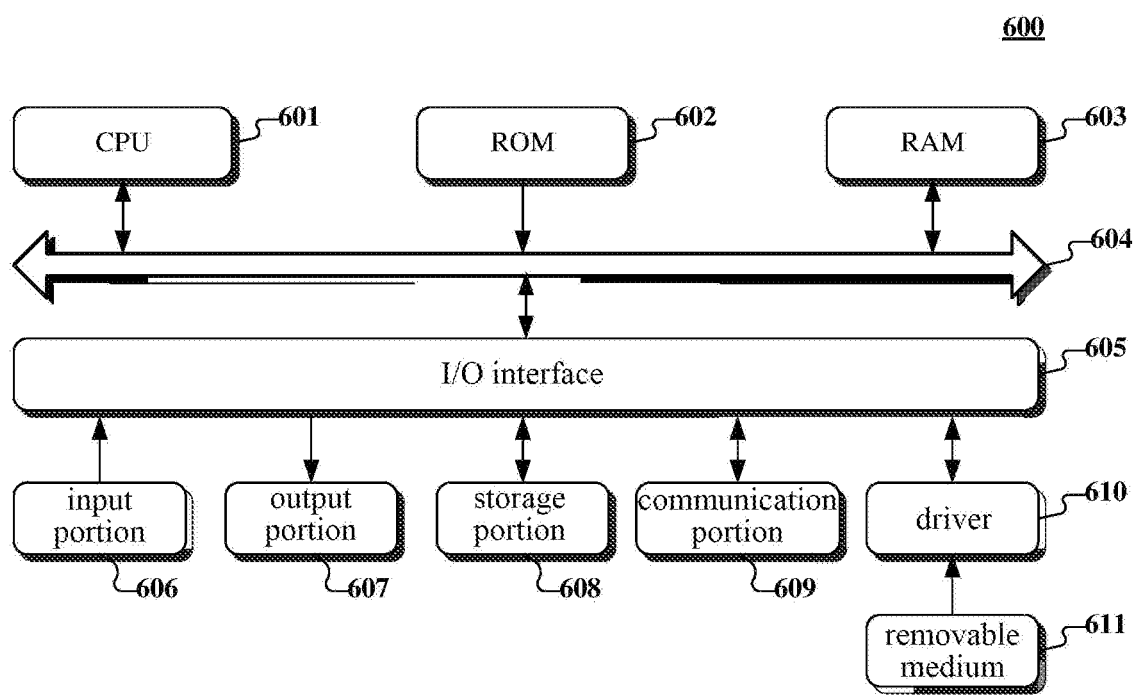
FIG. 6 is a schematic structural diagram of a computer system adapted to implement a terminal device or a server according to embodiments of the present disclosure.

Referring to FIG. 6, a schematic structural diagram of a computer system 600 adapted to implement a server of the embodiments of the present disclosure is shown.

As shown in FIG. 6, the computer system 600 includes a central processing unit (cpu) 601, which may execute various appropriate actions and processes in accordance with a program stored in a read-only memory (rom) 602 or a program loaded into a random access memory (ram) 603 from a storage portion 608. the ram 603 also stores various programs and data required by operations of the system 600. the cpu 601, the rom 602 and the ram 603 are connected to each other through a bus 604. an input/output (i/o) interface 605 is also connected to the bus 604.

The following components are connected to the i/o interface 605: an input portion 606 including a keyboard, a mouse etc.; an output portion 607 comprising a cathode ray tube (crt), a liquid crystal display device (lcd), a speaker etc.; a storage portion 608 including a hard disk and the like; and a communication portion 609 comprising a network interface card, such as a lan card and a modem. The communication portion 609 performs communication processes via a network, such as the internet. A driver 610 is also connected to the i/o interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. the computer program, when executed by the central processing unit (cpu) 601, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a receiving unit, a searching unit, a determining unit and a pushing unit, where the names of these units do not in some cases constitute a limitation to such units themselves. For example, the receiving unit may also be described as "a unit for receiving input information of a user from an information input terminal."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the terminals. The non-volatile computer storage medium stores one or more programs. The one or more programs, when executed by a device, cause the device to: receiving input information of a user from an information input terminal; performing a search operation based on the input information to obtain search result information; determining an information output terminal based on one or more of: indication information for the information output terminal extracted from the input information, historical indication information for the information output terminal of the user, and usage use scenario information of the user; and pushing the search result information to the determined information output terminal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for pushing information, comprising:
    receiving input information of a user from an information input terminal;
    performing a search operation based on the input information to obtain search result information, wherein the performing a search operation based on the input information to obtain search result information comprises:
        analyzing the input information to extract search information,
        performing the search operation based on the search information to obtain result information, and
        serving the result information as the search result information, if a list of website information of preset vertical websites does not include website information of a website including the result information, and performing a second search operation on the website including the result information based on the search information to acquire search results for use as the search result information, if the list of website information of the preset vertical websites includes the website information of the website including the result information, wherein the website information comprises at least one of a name of the website, a domain name of the website or an IP address of the website;
    determining an information output terminal based on one or more of: indication information for the information output terminal extracted from the input information, historical indication information for the information output terminal of the user, and use scenario information of the user; and
    pushing the search result information to the determined information output terminal.

2. The method according to claim 1, wherein when a number of the information output terminals is one, the information output terminal is different from the information input terminal.

3. The method according to claim 1, wherein the use scenario information comprises at least one of: a device type of the information input terminal, a device type of a terminal having a user account logged in same as a user account logged into the information input terminal, and position information of the terminal having the same user account logged in.

4. The method according to claim 1, wherein the input information further comprises a search time parameter, for indicating time for the search operation by using the search information.

5. The method according to claim 1, wherein the input information is voice information, and the determining an information output terminal comprises: extracting an identifier of a terminal from the input information, and using the terminal with the extracted identifier as the information output terminal.

6. The method according to claim 1, wherein the determining an information output terminal comprises: determining a terminal in proximity to the information input terminal as the information output terminal.

7. A non-volatile computer storage medium storing computer readable instructions executable by a processor, the instructions, when executed by the processor, causing the processor to perform a method for pushing information, comprising:
    receiving input information of a user from an information input terminal;
    performing a search operation based on the input information to obtain search result information, wherein the performing a search operation based on the input information to obtain search result information comprises:

analyzing the input information to extract search information, performing the search operation based on the search information to obtain result information, and serving the result information as the search result information, if a list of website information of preset vertical websites does not include website information of a website including the result information, and performing a second search operation on the website including the result information based on the search information to acquire search results for use as the search result information, if the list of website information of the preset vertical websites includes the website information of the website including the result information, wherein the website information comprises at least one of a name of the website, a domain name of the website or an IP address of the website;

determining an information output terminal based on one or more of: indication information for the information output terminal extracted from the input information, historical indication information for the information output terminal of the user, and use scenario information of the user; and pushing the search result information to the determined information output terminal.

8. An apparatus for pushing information, comprising:

at least one processor; and a memory storing instructions, which when executed by the at least one processor, cause the at least one processor to perform operations, the operations comprising:

receiving input information of a user from an information input terminal;

performing a search operation based on the input information to obtain search result information, wherein the performing a search operation based on the input information to obtain search result information comprises:

analyzing the input information to extract search information, performing the search operation based on the search information to obtain result information, and serving the result information as the search result information, if a list of website information of preset vertical websites does not include website information of a website including the result information, and performing a second search operation on the website including the result information based on the search information to acquire search results for use as the search result information, if the list of website information of the preset vertical websites includes the website information of the website including the result information, wherein the website information comprises at least one of a name of the website, a domain name of the website or an IP address of the website;

determining an information output terminal based on one or more of: indication information for the information output terminal extracted from the input information, historical indication information for the information output terminal of the user, and use scenario information of the user; and pushing the search result information to the determined information output terminal.

9. The apparatus according to claim 8, wherein when a number of the information output terminals is one, the information output terminal is different from the information input terminal.

10. The apparatus according to claim 8, wherein the use scenario information comprises at least one of: a device type of the information input terminal, a device type of a terminal having a user account logged in same as a user account logged into the information input terminal, and position information of the terminal having the same user account logged in.

11. The apparatus according to claim 8, wherein the input information further comprises a search time parameter, for indicating time for the search operation by using the search information.

* * * * *